Sept. 22, 1936.                E. E. SCOTT                2,055,367
                          REFRIGERATING SYSTEM
                          Filed Dec. 11, 1933
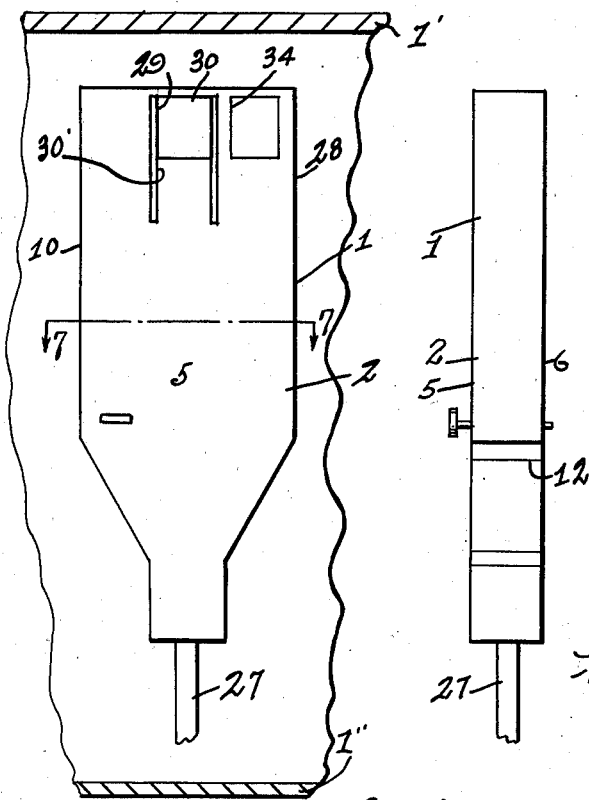
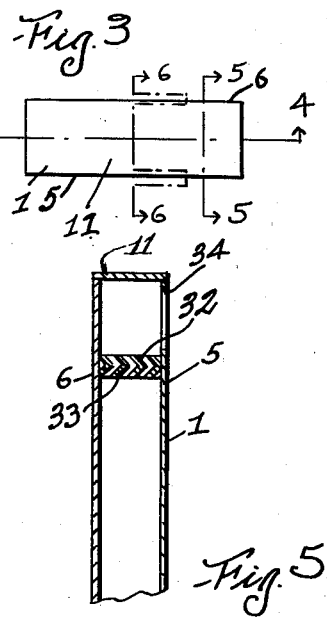
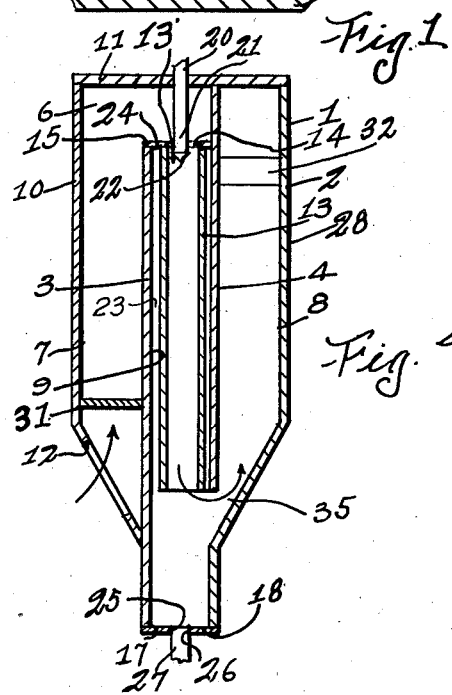
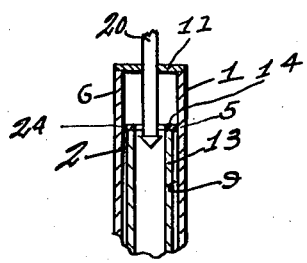
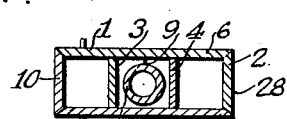
INVENTOR.
ELMER E. SCOTT
BY
Leo. R. Parker
ATTORNEY.

Patented Sept. 22, 1936

2,055,367

UNITED STATES PATENT OFFICE 2,055,367

REFRIGERATING SYSTEM

Elmer E. Scott, Dayton, Ky.

Application December 11, 1933, Serial No. 701,806

3 Claims. (Cl. 261—116)

The invention relates to refrigerating systems particularly adapted for use in cooling and circulating air in refrigerating compartments having meat stored therein.

Heretofore, considerable difficulty and uncertainty has been experienced by operators of refrigerating systems, utilized to preserve meat, in providing air cooling and circulating means adapted to circulate the air in such a manner that cooled air will completely envelope the meat, the meat will not dry out; and the moisture in the air will not condense on the ceiling of the room and drip upon the meat stored therein.

Various refrigerating systems have been utilized for the purpose of efficiently maintaining stored meats at low temperatures. One conventional system utilizes pipes positioned adjacent the walls and through which cold brine is circulated. The air in close proximity to the cold brine pipes is cooled and settles toward the floor of the room, thereby forcing the warm air upwardly which condition is depended upon to maintain continued circulation of the air. Still another conventional refrigerating system utilizes pipes having therein means for spraying brine which causes circulation of air through the pipes and outwardly therefrom toward the center of the room and in contact with meat which may be suspended from the ceiling. It is advantageous in the latter type of systems to control distribution of the currents of air throughout the upper and intermediate portions of the room in which the meat is suspended so that the cooled air directly contacts the meat and the currents of cool air move downwardly enveloping the meat, and continues to move from one part of the room to the other whereby condensation of moisture on the walls and ceiling is to a great extent prevented, particularly because the circulation of the air in all parts of the room prevents pockets of warm air collecting adjacent the ceiling.

Therefore, the general object of the invention is to provide a simple, efficient and practical manually operative means to control distribution of air from an air cooling means of a refrigerating system utilizing sprayed brine for the purpose of cooling air and causing currents of air to pass directly from the system into the room.

Other objects of the invention are to provide means whereby warm air may be caused to enter said air cooling means from the upper portion or from the lower portion of said room, or from both, whereby currents of air are caused to travel in various directions in the refrigerating room; to provide means whereby the quantity of air which passes into said refrigerating system may be regulated; to provide means to insulate the brine compartment from the air compartments of said air cooling means; and to provide efficient means to prevent salt from said brine leaving said air cooling means.

Still other objects of the invention will be apparent by reference to the hereinafter description and claims.

The invention consists in the combination of the elements, arrangement of the parts and in the details of the construction, as hereinafter claimed.

In the drawing:

Fig. 1 is a front elevational view of the invention;

Fig. 2 is a side elevational view of the same;

Fig. 3 is a plan view of the same;

Fig. 4 is a section taken on a line corresponding to 4—4 in Fig. 3;

Fig. 5 is a section taken on a line corresponding to 5—5 in Fig. 3, with parts broken away;

Fig. 6 in a section taken on a line corresponding to 6—6 in Fig. 3, with parts broken away; and Fig. 7 is a section on line 7—7 in Fig. 1.

In the preferred construction of the invention I provide the air cooler 1 having substantial length and which comprises the rectangular casing 2 having therein the walls or partitions 3 and 4 which extend from the front wall 5 to the rear wall 6 of the casing, whereby the outer compartments 7 and 8 and the intermediate compartment 9 are formed in the casing. The side wall 10, parallel with the walls 3 and 4, extends upwardly and connects with the top 11, of the casing and extends downwardly a sufficient distance to provide the opening or lower inlet 12, between the wall 10 and the wall 3, whereby air passes from the outside into the compartment 7 thence upwardly and into the brine tube 13 positioned within the compartment 9 and having its top 14 in horizontal alignment with the top 15 of the wall 3, which is spaced from the top 11, whereby the opening or passage 16 communicates with the compartment 7 and currents of air are adapted to pass from the compartment 7 into the brine tube 13 in the direction indicated by arrow 13'. The lower end 17 of the partition 3 extends downwardly and is integrally formed with the bottom 18 of the casing. The bottom 18 is positioned below the compartment 9 whereby brine from the tube 13 falls on the bottom 18.

Suitably connected with outside source of brine supply is the pipe 20 having fixed to its lower end 21 the spray nozzle 22 whereby brine spray is adapted to be forced downwardly through the tube 13, since the nozzle 22 is positioned adjacent the top of the brine tube.

The space 23 between the upper end of the brine tube 13 and the partitions 3 and 4 is sealed by the plate 24 whereby downward movement of the air currents though the brine tube 13, caused by movement of the brine spray, produces a vacuum in the space intermediate the brine tube 13 and the partitions 3 and 4 thereby effecting efficient insulation of the brine tube with respect to the front and rear walls 5 and 6, of the casing 2, whereby moisture is unlikely to condense on the front and rear walls of the casing and freeze thereon.

In the bottom 18, of the casing 2, is the hole 25 in alignment with the opening 26, of the drain pipe 27 which is secured to the bottom of the casing. The pipe 27 drains from the casing 2 the brine which is sprayed downwardly through the brine tube 13 and passes from its lower end and falls onto the upper surfaces of the bottom 18 of the casing.

In the front 5 of the casing and approximately spaced equi-distant from the side walls 10 and 28 is formed the doorway 29 adjacent the top 11 of the casing. The door 30 is slidingly mounted on the track 30' on the front of the casing and when closed it is adapted to close the doorway 29 for purposes hereinafter fully explained.

Hingedly connected at the bottom edge of the side wall 10 of the casing is the air regulating damper 31 which, when manually operated in horizontal position, as shown in Fig. 4, is adapted to close the air inlet or opening 12 which leads into the compartment 7 of the casing, for purposes hereinafter fully explained.

Suitably fixed, as by welding, to the front and rear walls 5 and 6, of the casing 2, is the baffle 32 which comprises a plurality of spaced apart angular metal plates 33. The air which passes from the brine tube 13 contains a percentage of salt brine received from the brine spray, which is sprayed through the brine tube, and passage of this air through the baffle 32 and the outlet 34 is adapted to cause such salt brine particles, as contact the baffle plates 33, to fall downwardly through the compartment 8 and onto the upper surface of the bottom 18 of the casing, whereby these brine particles are washed or drained into the drain pipe 27. Leading from the compartment 9 is the passage 35 which communicates with the compartment 8 positioned between the partition 4 and the side wall 28.

The operations of the invention are as follows:

A plurality of the air cooling units 1 may be attached in vertical positions to the side walls of a refrigerating room. It is preferred that the rear side wall 6, of the casing 2, shall contact the inner surface of the wall of the refrigerating room and be secured in predetermined position with the top 11 of each unit preferably positioned adjacent the ceiling 1' of the room.

Depending upon the desired and required circulation of air from the air cooling units the damper 31 and the door 30 are manually opened to such an extent to permit entrance of air through the inlet 12 and doorway 29 to accomplish the desired result. If it is desired that all the air, at relatively high temperature enters the casing 2, from the top thereof and adjacent the ceiling 1' of the room the damper 31 may be closed completely to prevent entrance of any air through the inlet 12 which is adjacent the floor 1" of the room, whereby downward movement of the brine spray, which passes from the nozzle 22, is adapted to force currents of air through the doorway 29 and thence through the brine tube 13, passage 35, compartment 8 and through the baffle 32 and outwardly from the casing through the outlet 34. If it is desired that no air currents enter the casing 2 through the doorway 29, then the door 30 is closed to seal the doorway, and the damper 31 is opened to permit currents of air to pass from adjacent the floor 1" of the room into the inlet 12 and thence through the compartment 7 and into the top of the brine tube 13, thence downwardly through the brine tube, and thence through the passage 35 and upwardly through the compartment 8, baffle 32 and outwardly from the casing through the outlet 34. If it is desired that a predetermined percentage of air, which enters the casing 2, shall enter the inlet 12 and a predetermined percentage of the air shall enter the doorway 29 then the door 30 is manually opened to a predetermined point and the damper 31 is manually opened a predetermined point, whereby the downward movement of the brine spray through the brine tube 13 creates currents of air therethrough which force or draw air from the room through the doorway 29 and the inlet 12, and the predetermined percentage of air which passes outwardly through the outlet 34 enters the doorway 29, from adjacent the ceiling 1' of the room, and a predetermined quantity of the air enters the inlet 12, from adjacent the floor 1" of the room.

The meat, carcasses, or other objects, which are intended to be maintained at a low temperature usually are suspended from the ceiling of the room, or if desired the articles may be supported by movable carriages movably mounted upon tracks which extend from one end of the room to the other, and are secured to and adjacent the ceiling.

The temperature of the currents of air which enter the inlet 12 and the doorway 29, or which enter the inlet 12 exclusively, or the doorway 29 exclusively, is considerably lowered, as by the passage through the brine tube 13 through which the brine passes, since the temperature of the brine is considerably lower than the temperature of the air in the room.

From the outlet 34 the cooled air passes from the casing 2 and circulates across the room. Since the warm air currents move upwardly and the cool air currents move downwardly, the currents of air which pass through the outlet 34 are adapted to move across the room from one wall to another and simultaneously downwardly completely enveloping the carcasses or other articles which may be suspended from the ceiling. Finally these currents of air, as the temperature thereof is raised due to contact with the carcasses and the walls of the room, as well as being mixed with other currents of air in the room whose temperature is relatively higher, results in the air within the room being continuously circulated at various and all parts thereof.

Under certain circumstances it may be desired that all of the warmer air which enters the casing 2 shall enter from adjacent the floor 1" and through the inlet 12, under which circumstances the door 30 may be closed to seal the doorway 29. Under other circumstances and conditions it may be desired to permit all of the air which enters the casing 2 to enter the doorway 29 and from adjacent the ceiling 1' of the room, in which event it simply is necessary to open the door 30 and close the damper 31. Under other circumstances and conditions it may be advisable to permit currents of air to enter the casing 2 from adjacent the floor 1'' and also adjacent the ceiling 1', under which circumstances it simply is necessary to partly or fully open both the damper 31 and the door 30.

An advantage of the invention is that by utilization of applicant's invention circulation of the air within the refrigerating room is controlled to a great degree, since the currents of air which enter the casing 2 may be regulated either to enter the casing from adjacent the floor, or from adjacent the ceiling, or from adjacent both the floor and the ceiling, whereby efficient circulation of the air within the refrigerating room provides efficient refrigeration for the purpose of preserving the carcasses and other articles which may be within the refrigerating room.

Another advantage of the invention is that the space between the brine tube 13 and the partitions 3 and 4 and the walls 5 and 6 is efficiently insulated to prevent the front and rear wall from being maintained at a low temperature, whereby the moisture which enters the refrigerating room is unlikely to condense and freeze on the casing 2.

Still another advantage of the invention is that the salt particles which are separated from the brine spray, by the currents of air which pass from the brine tube 13, are to a great extent removed therefrom when the currents of air pass through the baffle 32 before passing through the outlet 34 and from the casing 2.

Still another advantage is that the invention may be utilized with good results in beef storage and chill rooms, pork storage and chill rooms, sausage storage and curing rooms, meat display cases and retail boxes, brewery storage and fermentation cellars, creamery storage and chill rooms, vegetable storage rooms, fish storage rooms, egg and poultry storage rooms, provision storage rooms and fur storage rooms, and the like. Also, the invention may be effectively utilized in air conditioning of private residences and public buildings, as well as heating such buildings by substituting warm water for the cold brine spray.

The invention may also be used to control the temperature and humidity in green-houses, and other places where horticultural experiments are practiced.

An important advantage of the invention is that, irrespective of the conditions under which it is utilized, circulation of air through the spray which passes from the spray nozzle 2 washes dust and other foreign substances from the air and, also, increases the humidity of the air within the room or building in which the invention is utilized. This latter advantage is especially advantageous with respect to preservation of meat and other products which have a tendency under ordinary circumstances and conditions to dry and shrink.

It is, therefore, quite apparent that I have invented a highly desirable invention for the purposes intended and which may be utilized under various conditions for the purpose of providing efficient refrigeration or the opposite as may be required under various circumstances of its use.

While I believe that the form of the invention illustrated in the drawing and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. In a refrigerating system, an air cooler of substantial length adapted to be positioned vertically adjacent the side walls of a refrigerating room and having an air intake and an air outlet adjacent the top thereof and having an air intake adjacent the bottom thereof, means in said system adapted to induce currents of air to enter said air intakes and pass through said air cooling means and out of said outlet, and manually operative means to open and close said air intakes, and a baffle plate adjacent said outlet to remove foreign particles from the air which passes therethrough.

2. Air cooling means comprising a casing having a middle and two outer compartments, one of said outer compartments having an air outlet adjacent its top, said middle compartment having an air inlet at its top, the other of said outer compartments having an air inlet at its bottom, said compartments being so arranged that currents of air may pass through said air inlets and through said compartments and thence through said outlet, a brine tube in said middle compartment and spaced from the side walls thereof, said middle compartment being rectangular and having its top aligned with the top of said tube and the space between the top of said brine tube and the top of said middle compartment being closed, a cold brine supply pipe having its lower end positioned in the top of said brine tube, a spray nozzle on the lower end of said pipe whereby brine spray is directed downwardly through said tube thereby sucking air into said casing through said inlets, said tube having an open bottom through which the cooled air passes into the adjacent outer compartment and thence through said outlet, manually operative means to open and close said inlets.

3. A device of the class described, comprising air cooling means capable of being positioned in a refrigerating room and having air intakes and an air outlet, said air cooling means having a compartment therein, a brine tube positioned in said compartment and spaced from the walls thereof, means sealing the space between the top of said compartment and the top of said tube, brine spraying means in said tube adapted to induce currents of air to enter said intakes and pass through said air cooling means and out of said outlet, whereby a vacuum is created between the walls of said compartment and said brine tube, substantially as and for the purposes intended.

ELMER E. SCOTT.